(12) United States Patent
Boer et al.

(10) Patent No.: US 8,186,611 B1
(45) Date of Patent: May 29, 2012

(54) SEGMENTED KNIFE ASSEMBLY WITH REPLACEABLE WEAR SEGMENTS

(75) Inventors: Nolan Den Boer, Rock Valley, IA (US); Phil Kooima, Rock Valley, IA (US)

(73) Assignee: Kooima Company, Rock Valley, IA (US)

( * ) Notice: Subject to any disclaimer, the term of this patent is extended or adjusted under 35 U.S.C. 154(b) by 216 days.

(21) Appl. No.: 12/721,144

(22) Filed: Mar. 10, 2010

(51) Int. Cl.
B02C 18/18 (2006.01)

(52) U.S. Cl. .................... 241/294; 241/260.1

(58) Field of Classification Search .................. 241/294, 241/260.1
See application file for complete search history.

(56) References Cited

U.S. PATENT DOCUMENTS

| | | | |
|---|---|---|---|
| 276,951 A | 5/1883 | Baker | |
| 1,408,850 A | 3/1922 | Webb | |
| 1,929,838 A | 10/1933 | Crane | |
| 2,183,114 A | 12/1939 | Bonapace | |
| 2,934,120 A | 4/1960 | Schnell | |
| 3,022,621 A | 2/1962 | Zavarella | |
| 4,068,688 A | 1/1978 | Benson | |
| 4,205,564 A | 6/1980 | Kolb | |
| 4,690,024 A | 9/1987 | Chaconas | |
| 4,760,967 A | 8/1988 | Bendickson | |
| 4,770,253 A | 9/1988 | Hallissy | |
| 4,802,396 A | 2/1989 | Kuklinski | |
| 5,020,918 A | 6/1991 | Faccia | |
| 5,074,623 A | 12/1991 | Hedlund | |
| 5,082,188 A | 1/1992 | Urich | |
| 5,193,280 A | 3/1993 | Jackson | |
| 5,331,876 A | 7/1994 | Hayden | |
| 5,351,595 A | 10/1994 | Johnston | |
| 5,427,000 A | 6/1995 | Hellbergh | |
| 5,456,416 A | 10/1995 | Hartwig | |
| 5,553,937 A | 9/1996 | Faccia | |
| 5,613,537 A | 3/1997 | Gassiott | |
| 5,615,839 A | 4/1997 | Hartwig | |
| 5,647,665 A | 7/1997 | Schuler | |
| 5,772,131 A | 6/1998 | Dal Maso | |
| 5,823,449 A | 10/1998 | Kooima | |
| 6,000,649 A | 12/1999 | Loppoli | |
| 6,092,750 A | 7/2000 | Kooima | |
| 6,367,533 B1 | 4/2002 | Pitzen | |
| 6,662,837 B2 * | 12/2003 | Smith | 144/241 |
| 7,290,341 B2 | 11/2007 | Kooima | |
| 7,703,713 B2 * | 4/2010 | Smith | 241/242 |
| 2006/0242845 A1 | 11/2006 | Kooima | |

OTHER PUBLICATIONS

Standard Mixer Knife, Kooima Company Product Catalog, download date Feb. 16, 2010, www.kooima.com.

(Continued)

*Primary Examiner* — Faye Francis
(74) *Attorney, Agent, or Firm* — Jeffrey A. Proehl; Woods, Fuller, Shultz and Smith, P.C.

(57) ABSTRACT

A segmented knife assembly for a mixer apparatus is disclosed. The knife assembly has a front, a rear, and a perimeter with a cutting edge forming a portion of the perimeter. The segmented knife assembly includes a support portion positioned toward the rear of the knife assembly for positioning on the auger of the mixer apparatus when the knife assembly is mounted on the mixer apparatus, and a positioning portion on the support portion and defining at least one positioning pocket, with the pocket being oriented toward the cutting edge of the knife assembly. The assembly also include a cutting portion removably positioned in the pocket of the positioning portion. The cutting portion includes a cutting edge section that forms at least a portion of the cutting edge of the knife assembly.

19 Claims, 3 Drawing Sheets

OTHER PUBLICATIONS

Knife Backing Plate, Kooima Company Product Cataglo, download date Feb. 16, 2010, www.kooima.com.

Kuhn North America, VSL Vertical Maxx Single-Auger TMR Mixers, brochure, copyright 2009.

* cited by examiner

SEGMENTED KNIFE ASSEMBLY WITH REPLACEABLE WEAR SEGMENTS

BACKGROUND

1. Field

The present disclosure relates to knives for agricultural mixer apparatus and more particularly pertains to a new segmented knife assembly with replaceable wear segments for providing a means for replacing portions of the knives that are subject to the highest degree of wear while retaining portions that are not subject to the highest degree of wear.

2. Description of the Prior Art

A variety of agricultural implements, such as mixers, utilize blades or knives that are moved through materials to cut and mix the materials. The materials wear upon the surfaces of the knives, particularly on the relatively sharpened cutting edges of the knives, while other portions of the knives may be more protected and receive a lesser amount of wear. The wear on the cutting edge thus requires periodic replacement of the knives with new knives that have an unworn edge.

The replacement of the knives involves additional cost, and the time needed to replace the knives results in downtime for the equipment. Furthermore, virtually every different manufacturer of apparatus such as mixers utilizes a knife configuration that differs from the configurations utilized by other manufacturers, and thus a large inventory of the different knife configurations may need to be maintained by suppliers to meet the consumers' needs for replacement knives.

The segmented knife assembly with replaceable wear segments according to the present disclosure departs from the conventional concepts and practices.

SUMMARY

In view of the foregoing disadvantages inherent in the known types of knives for agricultural mixer apparatus now present in the prior art, the present disclosure describes a new segmented knife assembly with replaceable wear segments which may be utilized for providing a means for replacing portions of the knives that are subject to the highest degree of wear while retaining portions that are not subject to the highest degree of wear. By this disclosure, the cost and time involved in replacing worn knives may be reduced.

In one aspect, the present disclosure relates to a segmented knife assembly for a mixer apparatus. The segmented knife assembly has a front, a rear, and a perimeter with a cutting edge forming a portion of the perimeter of the knife assembly. The segmented knife assembly may comprise a support portion positioned toward the rear of the knife assembly for positioning on the auger of the mixer apparatus when the knife assembly is mounted on the mixer apparatus, and a positioning portion on the support portion and defining at least one positioning pocket. The pocket may be oriented toward the cutting edge of the knife assembly. The assembly may also comprise a cutting portion removably positioned in the pocket of the positioning portion, and the cutting portion may include a cutting edge section with the cutting edge section forming at least a portion of the cutting edge of the knife assembly.

In another aspect, a segmented knife assembly for a mixer apparatus, the segmented knife assembly has a front, a rear, and a perimeter with a cutting edge forming a portion of the perimeter of the knife assembly. The segmented knife assembly may comprise a support segment positioned toward the rear of the knife assembly for positioning on the auger of the mixer apparatus when the knife assembly is mounted on the mixer apparatus. The assembly may also comprise a positioning segment on the support portion and defining a pair of positioning pockets, the positioning pockets being oriented toward the cutting edge of the knife assembly. The assembly may further comprise a pair of cutting edge-forming segments each being removably positioned in one of the positioning pockets, with each of the cutting edge-defining segments including a cutting edge section to collectively define the cutting edge of the knife assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
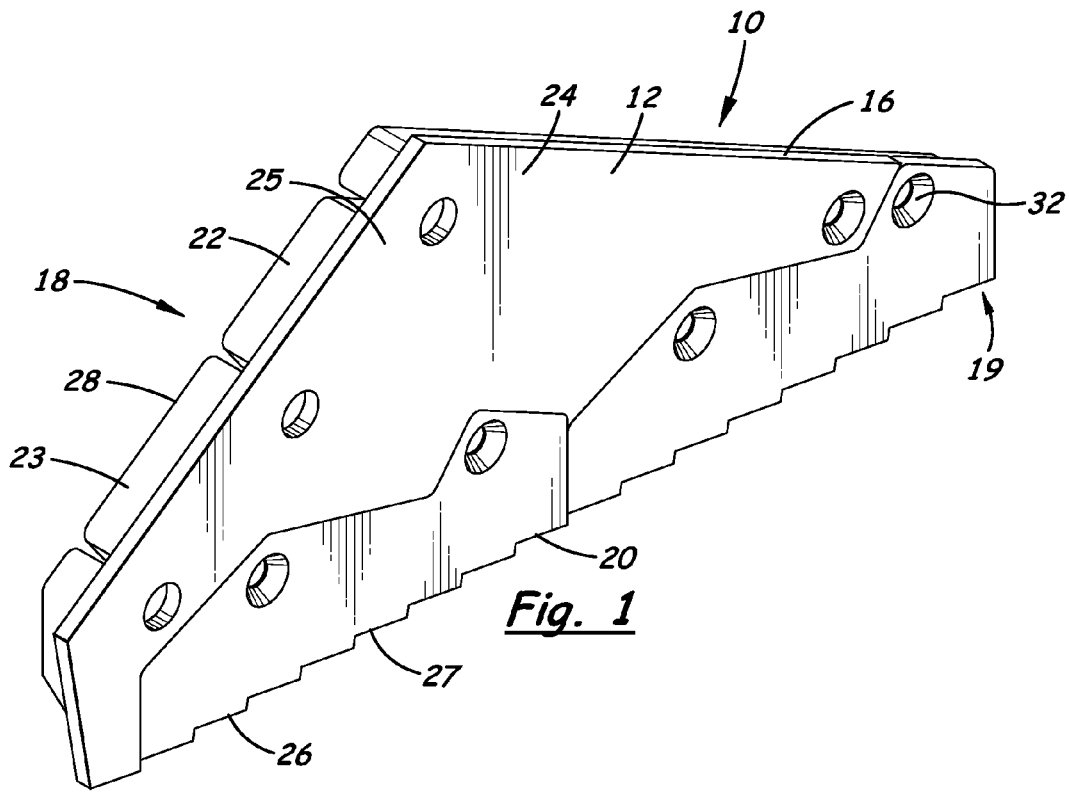
FIG. 1 is a schematic perspective front view of a new segmented knife assembly with replaceable wear segments according to the present disclosure.
Figure 2:
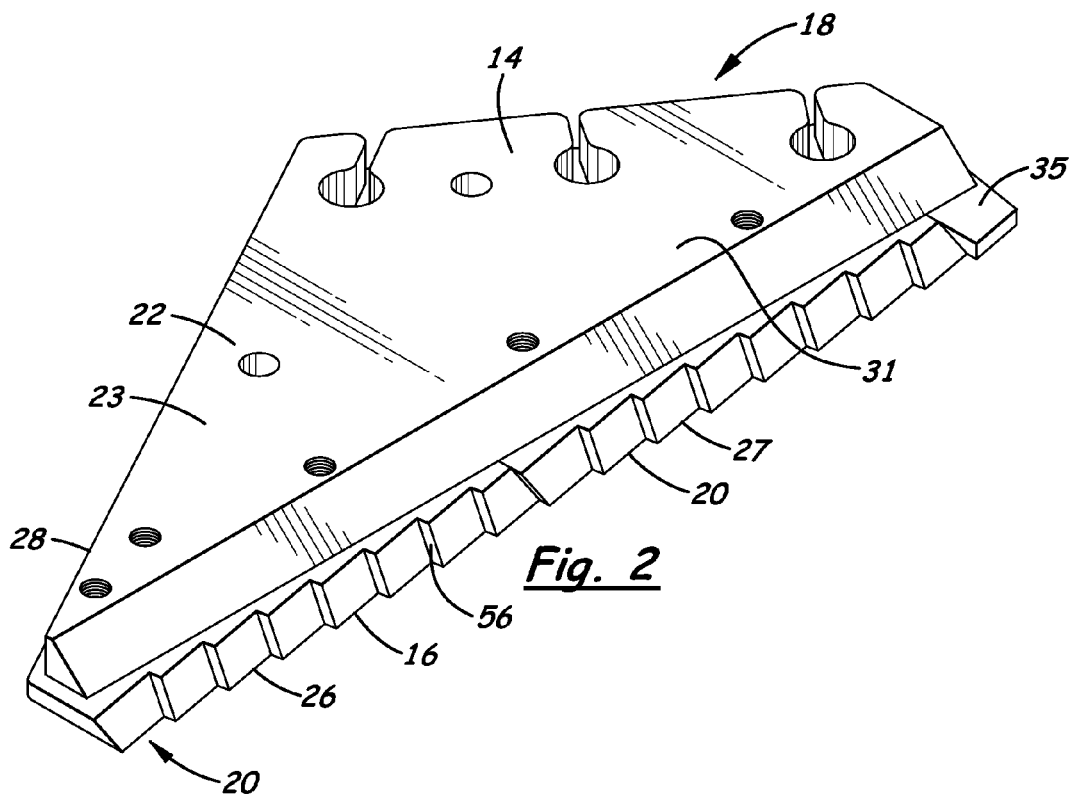
FIG. 2 is a schematic perspective rear view of the knife assembly, according to an illustrative embodiment.
Figure 3:
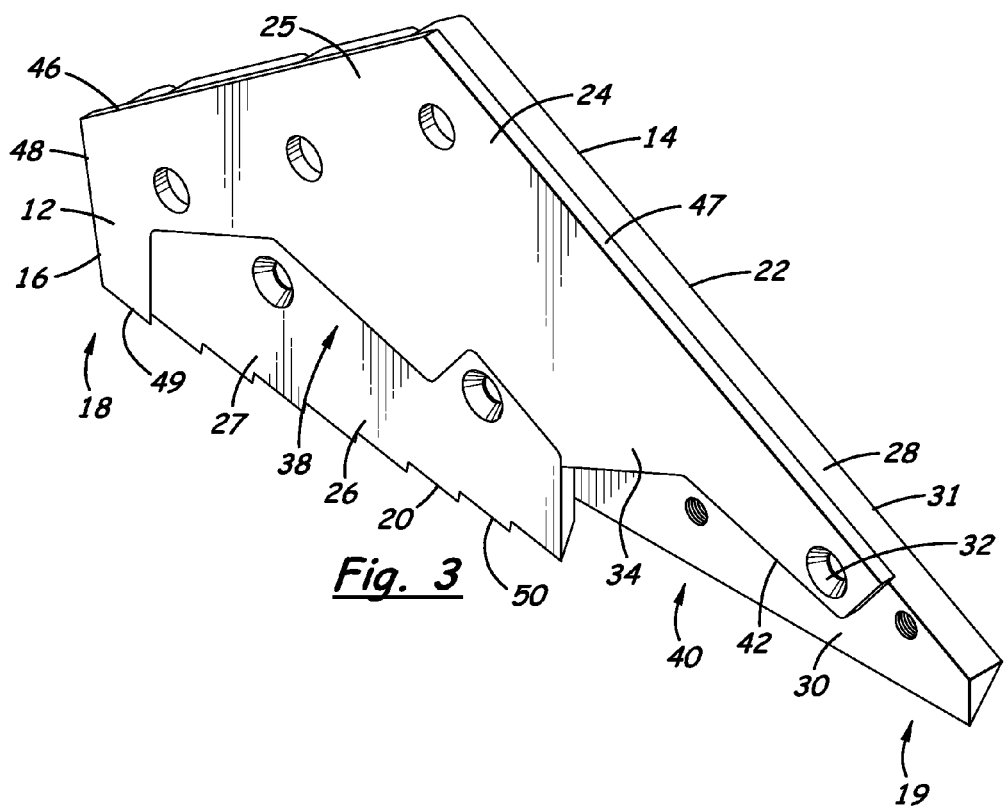
FIG. 3 is a schematic perspective side view of the knife assembly with one of the cutting edge-defining segments removed to reveal detail, according to an illustrative embodiment.
Figure 4:
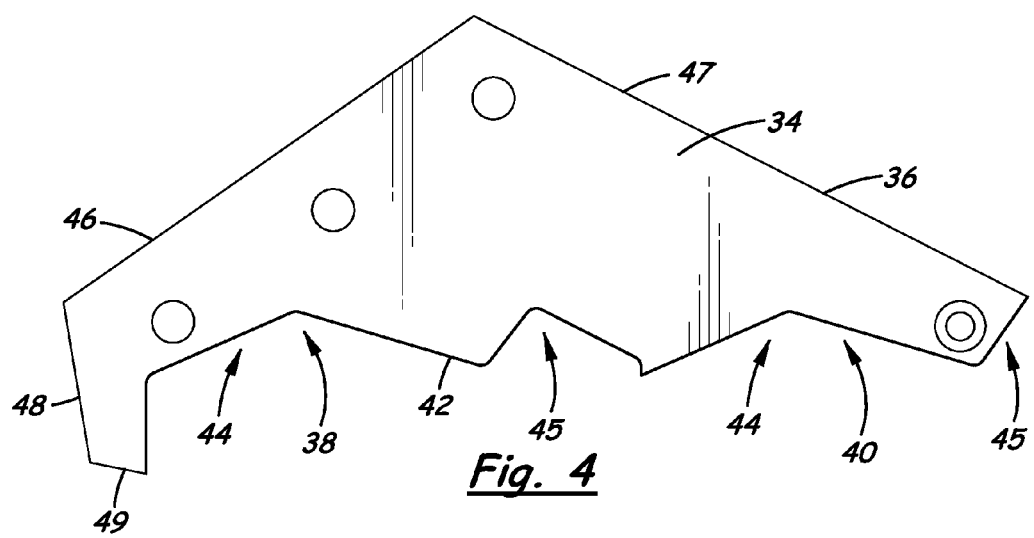
FIG. 4 is a schematic front view of the positioning portion of the segmented knife assembly, according to an illustrative embodiment.
Figure 5:
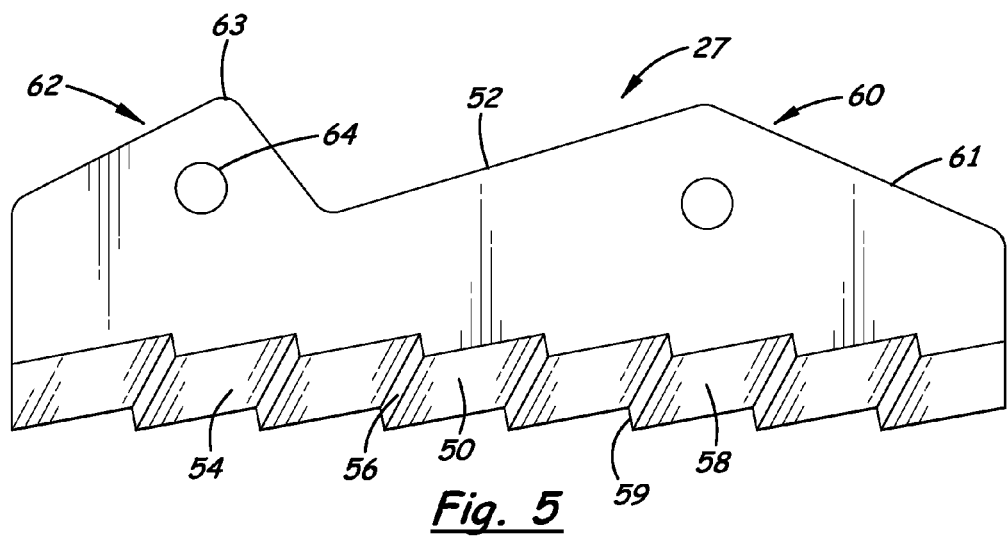
FIG. 5 is a schematic front view of the cutting portion of the knife assembly, according to an illustrative embodiment.
Figure 6:
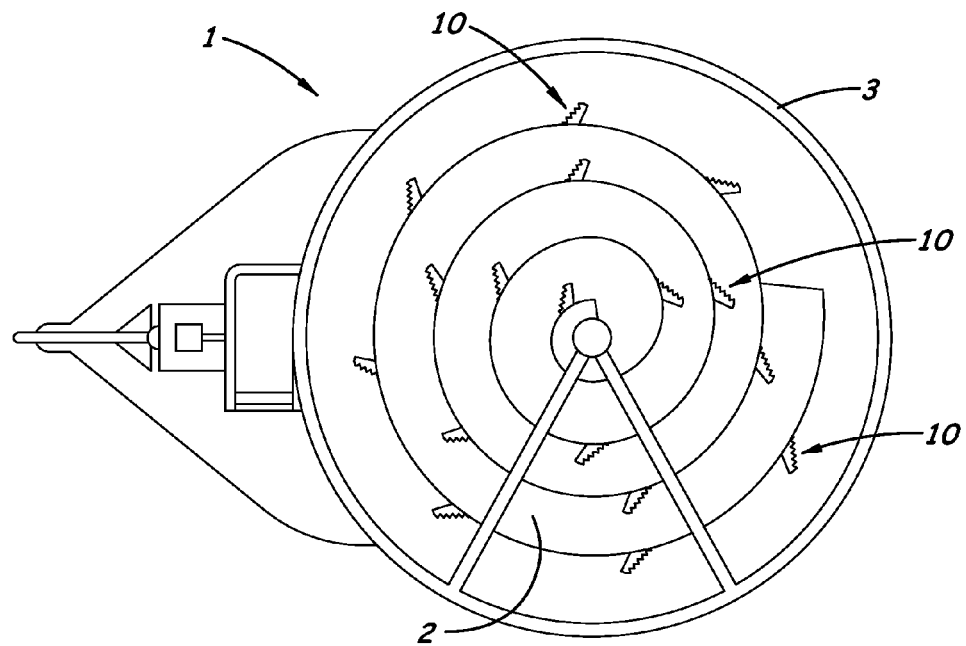
FIG. 6 is a schematic top view of an illustrative mixer apparatus with a plurality of the segmented knife assemblies installed thereon, according to an illustrative embodiment.

With reference now to the drawings, and in particular to FIGS. 1 through 6 thereof, a new segmented knife assembly with replaceable wear segments embodying the principles and concepts of the disclosed subject matter will be described.

The disclosure relates to a segmented knife assembly 10 that is highly suitable for use on, for example, a mixer apparatus 1. The mixer apparatus 1 may be utilized for mixing materials in an agricultural environment, and the materials mixed may include feed ingredients. Illustratively, the mixer apparatus 1 may have a rotor or auger 2 that is rotatable in the interior of a hopper 3, and the auger 2 may be rotatable about a substantially vertical axis, although in other mixer apparatus the auger may rotate about a substantially horizontal axis. A plurality of knives are typically removably mounted on the outward edges of the auger 2 for contacting the materials being mixed, and the segmented knife assembly 10 is intended to replace those knives, preferably but not necessarily using the holes formed in the auger used for mounting knives.

In general, the segmented knife assembly 10 has a front side 12 (see, e.g., FIG. 1) and a rear side 14 (see, e.g., FIG. 2), with the rear side generally being positioned against the auger 2 when installed on the mixer apparatus 1. In a vertically-oriented auger, the front side 12 may be oriented in an upward direction and the rear side may be oriented in a downward direction. The segmented knife assembly 10 may have an overall perimeter 16, and an inboard end 18 for mounting on the auger and an outboard end 19 located substantially opposite of the inboard end. The knife assembly 10 has a cutting edge 20 that extends along a portion of the perimeter 16 of the knife assembly, and the cutting edge may extend between the inboard 18 and outboard 19 ends, or a major portion of the distance between the ends 18, 19.

The segmented knife assembly 10 may comprise a support portion 22, a positioning portion 24, and a cutting portion 26. In the most preferred embodiments, the assembly 10 is comprised of a support segment 23, a positioning segment 25, and one or more cutting edge-forming segments 27 that are discrete pieces assembled together to form the knife assembly 10, but permit removal of one or more segments from the other segments.

In greater detail, the support portion 22 and the corresponding segment 23 may be positioned toward the rear side 14 of the knife assembly. The support portion 22 may be positioned adjacent to or against the auger 2 of the mixer apparatus 1 when the knife assembly 10 is mounted on the mixer apparatus. The support portion 22 may have a support perimeter 28, and the support may be inset or recessed from the perimeter 16 of the knife assembly. The support segment may be formed by a support plate that has a front face 30 and a rear face 31. The front 30 and rear 31 faces of the support segment may lie in substantially parallel planes, and the plate of the support segment may have a substantially uniform thickness, although this is not critical. In some embodiments, the thickness may taper thinner toward the cutting edge 20 of the knife assembly (see FIG. 2).

The positioning portion 24 may be positioned forward of the support portion 22 in the knife assembly, and may be positioned adjacent to against the front face 30 of the support portion. The portioning segment 25 may be removably mounted on the support segment 23 by, for example, at least one fastener 32 that extends through both the support segment and the positioning segment.

The positioning segment 25 may be formed by a positioning plate that has a forward face 34 and a rearward face 35. The rearward face 35 may be positioned against the front face 30 of the plate of the support segment. The positioning segment 25 may have a thickness, and the thickness of the positioning segment may be relatively less than the thickness of the support segment. In some embodiments, the thickness of the plate of the support segment is approximately twice the thickness of the plate of the positioning segment.

The positioning portion 24 may also have a positioning perimeter 36 which has portions that generally correspond to, and define, the perimeter 16 of the knife assembly. Significantly, the positioning perimeter 34 of the positioning portion 24 may form or define at least one positioning pocket 38, and in some preferred embodiments, the positioning portion defines a pair 38, 40 of positioning pockets. The pocket or pockets may be oriented toward the cutting edge 20 of the knife assembly, and the function of the one or more pockets will be described in greater detail in the context of the description of the cutting portion 26. The support portion 22 may function to form a floor for each of the pockets 38, 40.

To form the pocket or pockets, the positioning perimeter 36 may include a positioning edge 42 that extends in a general sense parallel to the cutting edge 20 of the knife assembly. The positioning edge 42 may be somewhat convoluted to correspond to a mating edge of the cutting portions described below. The positioning edge 42 may have similar contours for each of the pockets 38, 40 so that the cutting portions of similar shape may be interchanged between the pockets. Each of the pockets 38, 40 defined by the positioning edge may include a pair of recesses 44, 45 that accept complementary features on the cutting portions. The recesses 44, 45 do not need to be similarly shaped, and may be differently shaped (see FIG. 4).

The positioning perimeter 36 may also include a first edge 46 and a second edge 47 which may form a portion of the perimeter 16 of the knife assembly. The first edge 46 may extend along the inboard end 18 of the knife assembly, and the second edge 47 may extend generally between the inboard end 18 and the outboard end 19 of the knife assembly. The first 46 and second 47 edges may be substantially linear, although this is not critical. The positioning perimeter 36 may also have a third edge 48, and may extend from the first edge 46 toward the cutting edge 20 of the knife assembly. The positioning perimeter 36 may further have a fourth edge 49 that extends along a portion of the cutting edge 48 of the knife assembly. The fourth edge 49 may not have a surface capable of cutting material.

The cutting portion 26 may be positioned forward of the support portion 23 in the knife assembly 10, and may be removably mounted on the support portion by at least one fastener. The cutting portion 26, and the one or more cutting edge-forming segments 27, may be positioned in a substantially coplanar relationship with the positioning segment 25 in the knife assembly. The one or more cutting edge-forming segments 27 may have a cutting perimeter 52 that is configured for being positioned in one of the pockets 38, 40 and is complementary to the positioning edge of the positioning segment. Each of the cutting edge-forming segments may be removably mounted on the support segment.

Each of the cutting edge-forming segments 27 is removably positioned in one of the positioning pockets 38, 40 and the positioning pockets position the cutting edge sections 50 of the cutting edge-forming segments in an alignment along the cutting edge 20 of the knife assembly.

Illustratively, the cutting perimeter 52 of each of the cutting edge-forming segments 27 may comprise a cutting edge portion 54 which may form a serrated cutting edge with a plurality of teeth 56. Each tooth may have a long edge 58 and a short edge 60, although other tooth configurations may be used. The cutting perimeter 52 may also include a first lobe 60 defined by a first lobe-defining edge portion 61 and a second lobe 62 defined by a second lobe-defining edge portion 63. An aperture 64 may be formed in the each of the first 60 and second 62 lobes of the cutting portion for receiving a fastener. The first lobe 60 may be wider than the second lobe 62. The first lobe 60 and the second lobe 62 of each cutting edge-forming segment 27 are intermeshable with the positioning edge of the positioning perimeter. Preferably, but not critically, surfaces of the teeth 56 may be coated or formed with a carbide material to enhance the wear resistance.

The pocket or pockets formed on the knife assembly 10 allow for relatively easy and quick interchange of cutting segments with worn cutting edge sections with cutting segments having sharper cutting edge sections. The complete replacement of an entire knife is thus avoided in order to provide a new cutting edge with sharper teeth 56. The cost for replacing the cutting edge may be reduced significantly, to significantly less than half of the cost of replacing the whole knife in order to renew the cutting edge. The time required to replace the knife may also be reduced from approximately 30 minutes to replace the entire knife to approximately 5 minutes to replace the cutting portions.

Also, the use of multiple pockets to hold multiple cutting edge-defining segments 27 also may permit the rotation of the segments 27 on the knife assembly, so that segments 27 in positions receiving more wear may be switched with segments in positions receiving less wear. Additionally, the different portions of the knife assembly 10 may be fabricated with different materials so that the materials used may be selected and adapted to the particular function of the portion.

Further, while the configuration of the support portion, and in some cases the positioning portion, may be varied to meet the particular configuration requirements of a particular mixer apparatus manufacturer, the configuration of the cutting portion may be made common across the knife assemblies designed for different manufacturers' machines. Thus, one cutting portion configuration may be utilized on support portions and positioning portions designed for two or more different manufacturer's designs, and thus the periodic replacement of the cutting edge on different brands of mixers may be accomplished by a common cutting portion design, as only the more permanent support and positioning portions may be customized to a particular machine design. Suppliers of replacement parts may thus need to stock fewer cutting portions to service a large variety of different manufacturers' machines.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A segmented knife assembly for a mixer apparatus, the segmented knife assembly having a front, a rear, and a perimeter with a cutting edge forming a portion of the perimeter of the knife assembly, the segmented knife assembly comprising:
    a support portion positioned toward the rear of the knife assembly for positioning on the auger of the mixer apparatus when the knife assembly is mounted on the mixer apparatus;
    a positioning portion on the support portion and defining at least two positioning pockets, the positioning pockets being oriented toward the cutting edge of the knife assembly; and
    a cutting portion forming the cutting edge of the knife assembly, the cutting portion including at least two cutting edge-forming segments removably positioned in the pockets of the positioning portion such that the cutting edge-forming segments form adjacent portions of the cutting edge.

2. The assembly of claim 1 wherein the cutting edge-forming segments form sections of the same cutting edge of the knife assembly.

3. The assembly of claim 2 wherein the cutting edge-forming segments are substantially coplanar with the positioning segment in the knife assembly, the support portion being positioned rearwardly of the positioning portion and the cutting portion, the positioning and cutting portions being removably fastened to the support portion.

4. The assembly of claim 1 wherein the cutting portion includes a pair of the cutting edge-forming segments, each of the cutting edge-forming segments having a cutting edge section positionable in line with the cutting edge section of the other cutting edge-forming segment to form portions of the cutting edge of the knife assembly.

5. The assembly of claim 1 wherein the cutting portion is positioned forward of the support portion in the knife assembly, and the support portion and the positioning portion together form the at least one pocket.

6. The assembly of claim 1 wherein the cutting edge-forming segments are separate pieces.

7. The assembly of claim 1 wherein the positioning portion has a positioning perimeter and the cutting portion has a cutting perimeter, the positioning perimeter including a positioning edge with at least a portion of the positioning edge being complementary to a portion of the cutting perimeter of the cutting portion.

8. The assembly of claim 7 wherein the cutting perimeter of the cutting portion forms a pair of lobes, and the positioning perimeter of the positioning portion includes a pair of recesses having a shape complementary to the pair of lobes.

9. The assembly of claim 8 wherein the recesses of each of the positioning pockets are configured to interchangeably receive the lobes of each of the cutting edge-forming segments to be interchanged between the pockets.

10. The assembly of claim 1 wherein the positioning pockets position the cutting edge sections of the cutting edge-forming segments in an alignment along the cutting edge of the knife assembly so that the cutting edge sections form the cutting edge.

11. The assembly of claim 1 wherein the cutting portion is configured to be directly fastened to the support portion.

12. The assembly of claim 11 wherein the positioning portion is configured to be directly fastened to the support portion separate of the fastening of the cutting portion to the support portion.

13. The assembly of claim 1 wherein the positioning pockets and the cutting edge-forming segments are configured such that the cutting edge-forming segments are interchangeable between positions along the same cutting edge.

14. A segmented knife assembly for a mixer apparatus, the segmented knife assembly having a front, a rear, and a perimeter with a cutting edge forming a portion of the perimeter of the knife assembly, the segmented knife assembly comprising:

a support segment positioned toward the rear of the knife assembly for positioning on the auger of the mixer apparatus when the knife assembly is mounted on the mixer apparatus;

a positioning segment on the support portion and defining a pair of positioning pockets, the positioning pockets being oriented toward the cutting edge of the knife assembly; and a pair of cutting edge-forming segments each being removably positioned in one of the positioning pockets, each of the cutting edge-defining segments including a cutting edge section to collectively form a portion of the same cutting edge of the knife assembly;

wherein the positioning pockets and the cutting edge-forming segments are configured such that the cutting edge-forming segments are interchangeable between positions along the same cutting edge.

15. The assembly of claim 14 wherein each of the cutting edge-forming segments are oriented substantially coplanar with the positioning segment in the knife assembly, the support segment being positioned rearwardly of the positioning segment and the cutting edge-defining segments, the positioning segment and the cutting edge-defining segments being removably fastened to the support segment.

16. The assembly of claim 14 wherein the cutting portion is configured to be directly fastened to the support portion.

17. The assembly of claim 16 wherein the positioning portion is configured to be directly fastened to the support portion separate of the fastening of the cutting portion to the support portion.

18. A segmented knife assembly for a mixer apparatus, the segmented knife assembly having a front, a rear, and a perimeter with a cutting edge forming a portion of the perimeter of the knife assembly, the segmented knife assembly comprising:

a support portion positioned toward the rear of the knife assembly for positioning on the auger of the mixer apparatus when the knife assembly is mounted on the mixer apparatus;

a positioning portion on the support portion and defining at least two positioning pockets, the positioning pockets being oriented toward the cutting edge of the knife assembly; and a cutting portion forming the cutting edge of the knife assembly, the cutting portion including at least two cutting edge-forming segments removably positioned in the pockets of the positioning portion such that the cutting edge-forming segments form adjacent portions of the cutting edge;

wherein at least one aperture formed in each of the cutting edge-forming segments is alignable with a hole in the support portion to permit a fastener to removably mount the segment to the support portion.

19. The assembly of claim 18 wherein at least one aperture formed in the positioning portion is alignable with a hole in the support portion to permit a fastener to removably mount the positioning portion to the support portion independent of the fastening of the cutting edge-forming segments to the support portion.

\* \* \* \* \*